No. 852,667. PATENTED MAY 7, 1907.
L. P. MARSAL & R. W. BAKER.
WHEEL FOR CHILDREN'S CARRIAGES.
APPLICATION FILED JAN. 8, 1906.
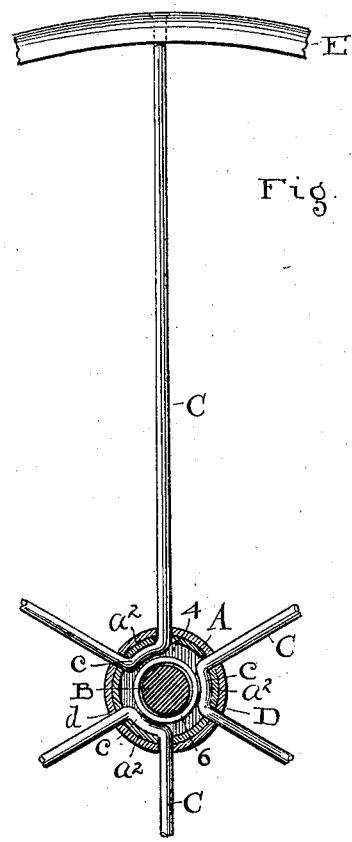
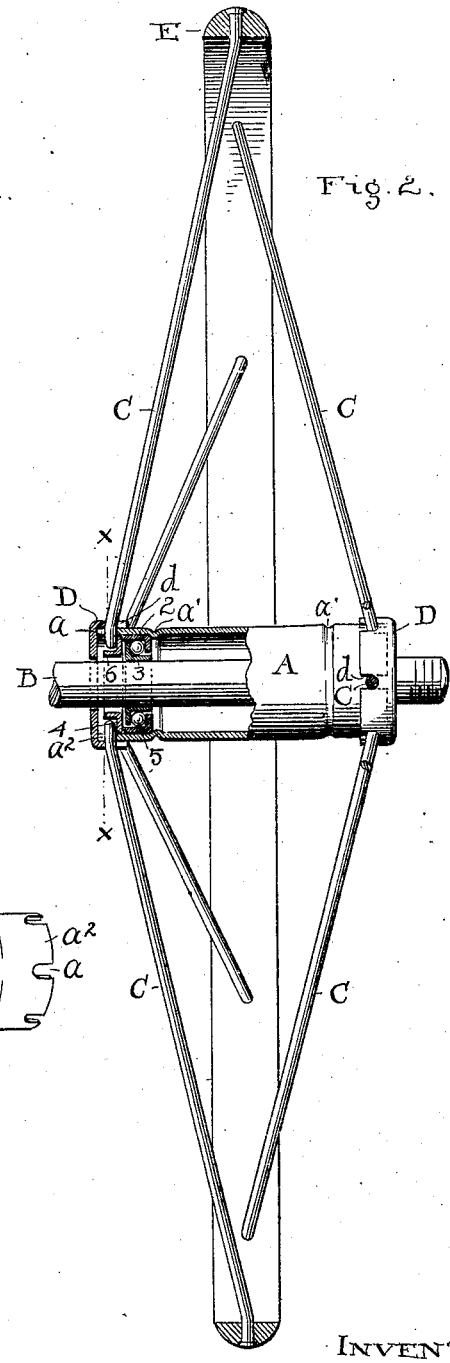
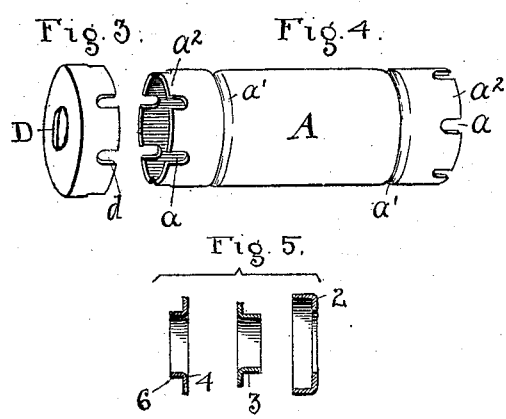
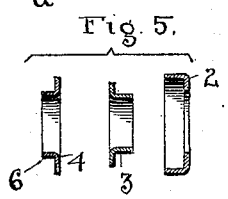
ATTEST
INVENTORS
Louis P. Marsal
Richard W. Baker
By H. J. Fisher ATTY.

UNITED STATES PATENT OFFICE.

LOUIS P. MARSAL AND RICHARD W. BAKER, OF CLEVELAND, OHIO.

WHEEL FOR CHILDREN'S CARRIAGES.

No. 852,667.  Specification of Letters Patent.  Patented May 7, 1907.

Application filed January 8, 1906. Serial No. 295,011.

*To all whom it may concern:*

Be it known that we, LOUIS P. MARSAL and RICHARD W. BAKER, citizens of the United States, residing at Cleveland, in the county of Cuyahoga and State of Ohio, have invented certain new and useful Improvements in Wheels for Children's Carriages; and we do declare that the following is a full, clear, and exact description of the invention, which will enable others skilled in the art to which it appertains to make and use the same.

Our invention relates more especially to wheels for children's carriages and the lighter grades of vehicles which are not subjected to excessive strains and will endure with the simple means we employ for holding the parts together, all substantially as shown and described and particularly pointed out in the claims.

In the accompanying drawings Figure 1 is a cross section of the wheel on line $x, x$, Fig. 2, and Fig. 2 is a cross section of the wheel with a portion of one end of the hub sectioned away to disclose construction and relation of the parts. Fig. 3 is a perspective view of one of the spoke confining caps, and Fig. 4 is a perspective view of the hub-tube. Fig. 5 represents a group of three several flanged parts which form bearings in the ends of the hubs.

Simplicity combined with serviceability and cheapness are the prime objects of this invention, so that a thoroughly good wheel can be produced at the least cost. To this end we employ a tube A which constitutes the main portion of the hub of the wheel and is provided with open slots $a$ at given intervals directly in its ends and circumferential beads $a'$ a short distance from each end inside to provide shoulders or stops for the ball bearing ring 2 which comes up against the same in use and is tight in the hub. Inside of this ring is a counter ring 3 which engages snugly on the spindle B and said rings 2 and 3 form a race between them for anti-friction balls 5, so that when the wheel revolves the bearing ring 2 really turns with it on said balls, and a very easy and noiseless bearing is afforded. These two rings 2 and 3, come back of and within slots $a$, which leaves room for ring 4 outside of rings 2 and 3, as clearly shown.

The spokes C are formed out of suitable wire, and one piece of wire forms two spokes. To this end said wires are bent at their middle where they come into the hub with a connecting portion $c$, slightly curved and in bearing relation with neck 6 of ring 4. The two stems or spokes of the wire diverge from this connecting portion through adjacent slots $a$ in the end of the hub, and caps D have slots $d$ corresponding to slots $a$ so as to enter past the spokes over tube A, and said cap is forced upon the end of the hub-tube so as to lock the spokes in place or is secured thereon in some equivalent way which does not require rivets, screws or other such fastening. Thus, all the several parts including rings 2, 3 and 4 and the spokes are confined by caps D, and the said caps are not specially fastened except as they are made to engage so tightly upon the hub that no other means of fastening are required. The wheel has the usual rim E at its tread.

It will be noticed that the bent connecting portions $c$ of the spokes are closely confined between the neck 6 of ring 4 and the end portions $a^2$ of the hub between slots $a$, so that there is no rattling or looseness at this point. Practically, the inner ring 3 is the bearing for spindle or axle B, through balls 5. Ring 2 is forced in place against shoulder $a'$ and is frictionally held against rotation within barrel or tube A. Spokes C when riveted to rim E are under such tension that they lock ring 4 in place and even if caps D were removed it would be practically impossible to remove the bearings without first destroying the spokes. By omitting the spokes and wheel rim, hub A and the other assembled parts may be used as a bearing for any suitable purpose, and in this case the hub would be stationary and the spindle would revolve.

What we claim is:—

1. A wheel having a tubular hub with a series of open slots at regular intervals in its ends, separate rings within the ends of the hub and spokes having bent portions in bearing relation with said rings, and slotted caps sleeved over the ends of the hub confining the spokes in working position.

2. In wheels, a tubular hub having open slots in its ends, opposed ball-bearing rings in the end of said hub, a supporting ring for the spokes next outside of said ball-bearing rings, spokes in bearing relation with said supporting rings and means to confine the spokes thereon.

3. The tubular hub having open slots in its ends and spoke confining caps adapted to sleeve over the ends of the hub and having slots corresponding to the slots in the hub, in combination with rings in the ends of the hub, reversely bent spokes having curved connecting portions in bearing relation with said rings, a spindle through said hub and bearings therefor inward from said rings in which said spindle is adapted to rotate.

In testimony whereof we sign this specification in the presence of two witnesses.

LOUIS P. MARSAL.
RICHARD W. BAKER.

Witnesses:
C. A. SELL,
R. B. MOSER.